(12) United States Patent
Miyoshi et al.

(10) Patent No.: US 11,328,849 B2
(45) Date of Patent: May 10, 2022

(54) ELECTRIC ACTUATOR

(71) Applicant: MITSUBISHI HEAVY INDUSTRIES, LTD., Tokyo (JP)

(72) Inventors: Masato Miyoshi, Tokyo (JP); Daiki Hatakeyama, Tokyo (JP)

(73) Assignee: MITSUBISHI HEAVY INDUSTRIES, LTD., Tokkyo (JP)

( * ) Notice: Subject to any disclaimer, the term of this patent is extended or adjusted under 35 U.S.C. 154(b) by 0 days.

(21) Appl. No.: 17/287,298

(22) PCT Filed: Jan. 8, 2020

(86) PCT No.: PCT/JP2020/000270
§ 371 (c)(1),
(2) Date: Apr. 21, 2021

(87) PCT Pub. No.: WO2020/170624
PCT Pub. Date: Aug. 27, 2020

(65) Prior Publication Data
US 2021/0358670 A1    Nov. 18, 2021

(30) Foreign Application Priority Data

Feb. 20, 2019  (JP) .............................. JP2019-028500

(51) Int. Cl.
*H01F 7/16* (2006.01)
(52) U.S. Cl.
CPC .................................. *H01F 7/1607* (2013.01)
(58) Field of Classification Search
CPC .................................................. H01F 7/1607
(Continued)

(56) References Cited

U.S. PATENT DOCUMENTS 9,280,239 B2 *  3/2016  Rosener ............... H03K 17/962
9,836,125 B2 * 12/2017  Lim ....................... G06F 3/0412
(Continued)

FOREIGN PATENT DOCUMENTS

JP        S61-042268 A     2/1986
JP        S61-199761 U    12/1986
(Continued)

OTHER PUBLICATIONS

PCT/ISA/210, "International Search Report for PCT International Application No. PCT/JP/2020/000270," dated Mar. 17, 2020.
(Continued)

*Primary Examiner* — Alexander Talpalatski
(74) *Attorney, Agent, or Firm* — Manabu Kanesaka; Benjamin Hauptman; Kenneth Berner

(57) ABSTRACT

The present invention comprises: a rod used as a rod-shaped member; an electroconductive polymer actuator having an electroconductive polymer that expands and contracts in a prescribed direction due to electric current; and an electromagnetic actuator having a fixed magnetic pole part in which the magnetic pole arrangement is fixed, and a variable magnetic pole part in which the magnetic pole arrangement is changed by switching of electric current, the fixed magnetic pole part and the variable magnetic pole part moving relative to each other due to the magnetic pole arrangement of the variable magnetic pole part being changed. The fixed magnetic pole part or the variable magnetic pole part is connected to the electroconductive polymer so that the relative movement direction of the fixed magnetic pole part and the variable magnetic pole part matches the expansion-contraction direction of the electroconductive polymer, and the rod is connected to the electroconductive polymer.

4 Claims, 15 Drawing Sheets

(58) Field of Classification Search
USPC .......................................................... 335/279
See application file for complete search history.

(56) References Cited

U.S. PATENT DOCUMENTS

2013/0063319 A1* 3/2013 Snyder, Jr .......... G01R 33/3628
338/68
2019/0214924 A1 7/2019 Yamauchi et al.

FOREIGN PATENT DOCUMENTS

| JP | 2005-111245 A | 4/2005 |
| JP | 2011-030368 A | 2/2011 |
| JP | 2014-145452 A | 8/2014 |
| JP | 2018-050445 A | 3/2018 |

OTHER PUBLICATIONS

PCT/ISA/237, "Written Opinion for PCT International Application No. PCT/JP/2020/000270," dated Mar. 17, 2020.

* cited by examiner

FIG. 19
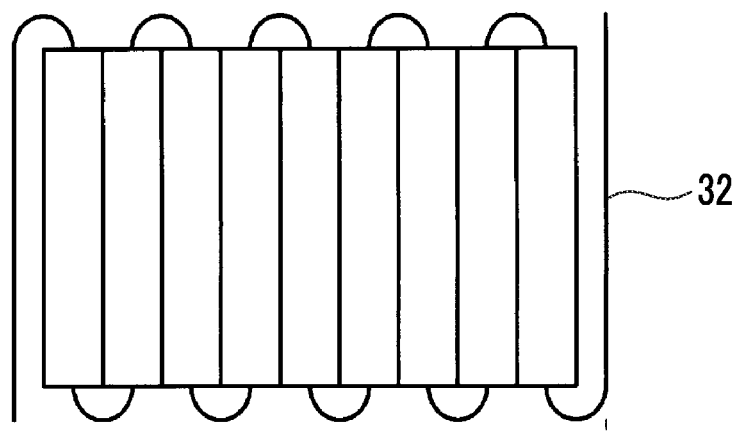
VOLTAGE APPLICATION: ABSENT
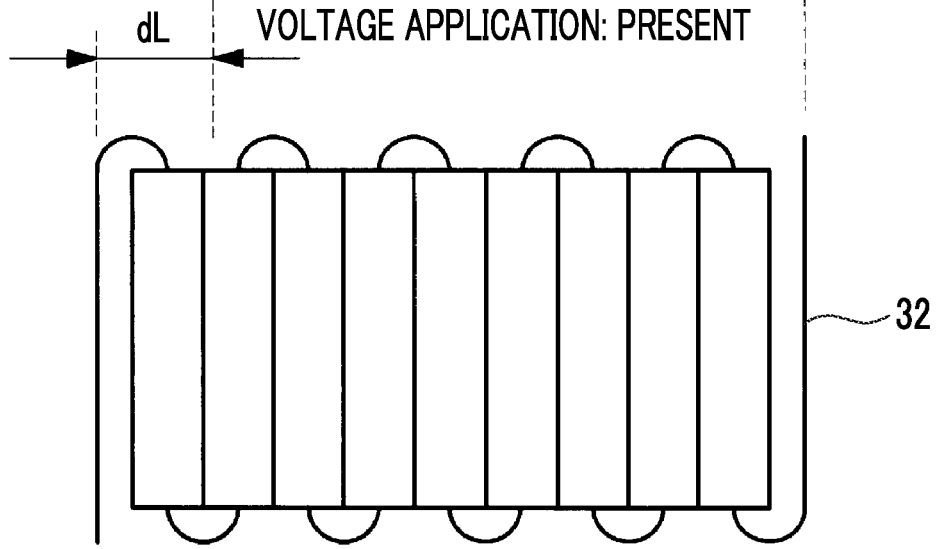
dL  VOLTAGE APPLICATION: PRESENT

ELECTRIC ACTUATOR

RELATED APPLICATIONS

The present application is National Phase of International Application No. PCT/JP2020/000270 filed Jan. 8, 2020, and claims priority from Japanese Application No. 2019-028500, filed Feb. 20, 2019, the disclosure of which is hereby incorporated by reference herein in its entirety.

TECHNICAL FIELD

The present disclosure relates to an electric actuator.

BACKGROUND ART

In recent years, a weight decrease and an output increase have been progressively realized in electric actuators, thereby increasing opportunities that the electric actuators may be adopted in operating a control surface of an aircraft. However, when a ball screw mechanism is adopted for the electric actuators, there is a possibility of mechanical jamming that a ball nut may be firmly fixed onto a rotating screw.

When the mechanical jamming occurs, the control surface of the aircraft is fixed at an unintended position, and it becomes difficult to control an airframe as a pilot intends, thereby causing a possibility of a serious accident.

As a countermeasure against such an event, there is a method of adopting an actuator provided with a clutch. According to the method, a clutch provided in the actuator is disengaged so that the control surface fixed at the unintended position is released from the aircraft, and the aircraft is controlled by operating another normal control surface.

In addition, although another method is not adopted in operating the control surface of the aircraft, PTL 1 discloses an actuator including an applying device that applies tension to correct a tension change caused by extension of an actuator member in order to stabilize an operation of the actuator under a condition that the actuator member is naturally deformed (for example, influence of moisture or oil in a surrounding environment).

CITATION LIST

Patent Literature

[PTL 1] Japanese Unexamined Patent Application Publication No. 2018-50445

SUMMARY OF INVENTION

Technical Problem

The actuator disclosed in PTL 1 does not adopt a mechanical structure, for example, such as the ball screw mechanism. Accordingly, it is considered that mechanical jamming caused by the firmly fixed ball nut does not occur.

However, the above-described applying device corrects the actuator member, and the actuator member bears an operating force required for operating the actuator. Therefore, there is a possibility that the actuator member may increase in size to ensure the operating force.

The present disclosure is made in view of the above-described circumstances, and aims to provide an actuator which can be miniaturized, can perform highly accurate positioning while a required operating force is ensured, and does not cause mechanical jamming.

Solution to Problem

In order to solve the above-described problem, an electric actuator according to the present disclosure adopts the following means.

That is, according to an aspect of the present disclosure, there is provided an electric actuator including a rod formed of a rod-shaped member, a conductive polymer actuator having a conductive polymer that expands and contracts in a predetermined direction by an electric current, or a laminated electrostatic actuator having an electrode laminated element that expands and contracts in a predetermined direction by an electric current, and an electromagnetic force actuator having a fixed magnetic pole portion in which a magnetic pole arrangement is fixed, and a variable magnetic pole portion in which the magnetic pole arrangement is changed by switching the electric current, and in which the magnetic pole arrangement of the variable magnetic pole portion is changed so that the fixed magnetic pole portion and the variable magnetic pole portion move relative to each other. Any one of the fixed magnetic pole portion and the variable magnetic pole portion is connected to the conductive polymer or the electrode laminated element so that a relative movement direction thereof coincides with an expanding-contracting direction of the conductive polymer or the electrode laminated element. The rod is connected to the conductive polymer or the electrode laminated element, and the one of the fixed magnetic pole portion and the variable magnetic pole portion which are connected to the conductive polymer or the electrode laminated element.

According to the electric actuator in this aspect, any one of the fixed magnetic pole portion and the variable magnetic pole portion is connected to the conductive polymer or the electrode laminated element so that the relative movement direction coincides with the expanding-contracting direction of the conductive polymer or the electrode laminated element. The rod is connected to the conductive polymer or the electrode laminated element, and the one of the fixed magnetic pole portion and the variable magnetic pole portion which are connected to the conductive polymer or the electrode laminated element.

In this manner, the rod is connected in parallel to the conductive polymer or the electrode laminated element, and any one of the fixed magnetic pole portion and the variable magnetic pole portion which are connected to the conductive polymer or the electrode laminated element. In other words, the rod is moved in an axial direction by two actuators of the conductive polymer actuator or the laminated electrostatic actuator, and the electromagnetic force actuator. Therefore, the rod can simultaneously receive operating forces from the two actuators. In other words, a resultant force of the operating force of the conductive polymer actuator or the laminated electrostatic actuator and the operating force of the electromagnetic force actuator is applied to the rod.

Therefore, the two actuators can sufficiently bear the operating forces required for the movement of the rod. Accordingly, electric power required for each actuator can be suppressed, and the actuator can be miniaturized.

In this case, the conductive polymer actuator or the laminated electrostatic actuator has a greater expanding-contracting force (that is, an operating force for moving the rod) than that of the electromagnetic force actuator. However, positioning accuracy or responsiveness is not high. In contrast, the electromagnetic force actuator has a smaller force applied between the variable magnetic pole portion and the fixed magnetic pole portion (that is, the operating force for moving the rod) than that of the conductive polymer actuator or the laminated electrostatic actuator. However, the positioning accuracy or the responsiveness is satisfactory.

Therefore, in the operating force required for the movement of the rod (that is, expansion and contraction of the electric actuator), the conductive polymer actuator or the laminated electrostatic actuator is configured to bear most of the operating force, and the electromagnetic force actuator is configured to bear the remaining operating force. In this manner, when the rod is moved, the required operating force can be ensured by the two actuators. In addition, when the movement of the rod is completed, the electromagnetic force actuator can have high responsiveness, and can perform highly accurate positioning.

The electric actuator configured in this way is suitably adopted in operating a control surface of an aircraft (an aileron, an elevator, or a rudder), for example. In this case, for example, mechanical jamming that may occur in a ball screw mechanism does not occur. Therefore, it is possible to suppress a possibility that the control surface of the aircraft may be fixed at an unintended position. In addition, the actuator can be miniaturized, and highly responsive and highly accurate positioning can be performed while the required operating force is ensured.

In addition, the electric actuator according to the aspect of the present disclosure may further include a casing that accommodates the rod. One end side of the conductive polymer or the electrode laminated element in the expanding-contracting direction may be connected to the casing. The variable magnetic pole portion may be fixed to the casing. The fixed magnetic pole portion may be connected to the other end side of the conductive polymer or the electrode laminated element in the expanding-contracting direction. The rod may be connected to the fixed magnetic pole portion.

According to the electric actuator in this aspect, the variable magnetic pole portion is fixed to the casing, the fixed magnetic pole portion is connected to the conductive polymer or the electrode laminated element, and the rod is connected to the fixed magnetic pole portion.

The variable magnetic pole portion needs to supply electricity in order to generate a magnetic force, and a structure thereof is more complicated than that of the fixed magnetic pole portion (for example, a permanent magnet in which respective poles are alternately arranged). Therefore, the variable magnetic pole portion is connected and fixed to the casing. In this manner, it is possible to avoid the movement of the variable magnetic pole portion having the complicated structure (movement caused by the expansion and contraction of the conductive polymer or the electrode laminated element). In this manner, the structure can be simplified.

In addition, the electric actuator according to the aspect of the present disclosure may further include an electricity supply unit that supplies electricity to the conductive polymer actuator or the laminated electrostatic actuator, and the variable magnetic pole portion, and a control unit that controls the electricity output from the electricity supply unit. When the rod is moved, the control unit may control the electricity supply unit to perform expansion and contraction of the conductive polymer actuator or the laminated electrostatic actuator simultaneously with relative movement between the variable magnetic pole portion and the fixed magnetic pole portion.

According to the electric actuator in this aspect, when the rod is moved, the control unit controls the electricity supply unit to perform the expansion and contraction of the conductive polymer actuator or the laminated electrostatic actuator simultaneously with the relative movement between the variable magnetic pole portion and the fixed magnetic pole portion.

In this manner, the rod simultaneously receives the operating forces from the two actuators (the conductive polymer actuator or the laminated electrostatic actuator, and the electromagnetic force actuator). Accordingly, a resultant force of the two operating forces is applied to the rod. Therefore, when the rod is moved (that is, the electric actuator expands and contracts), the required operating force can be ensured by the two actuators.

In addition, in the electric actuator according to the aspect of the present disclosure, when the movement of the rod is completed, the control unit controls the electricity supply unit to stop the relative movement between the fixed magnetic pole portion and the variable magnetic pole portion.

According to the electric actuator in this aspect, when the movement of the rod is completed, the control unit may control the electricity supply unit to stop the relative movement between the fixed magnetic pole portion and the variable magnetic pole portion.

As described above, in the conductive polymer actuator or the laminated electrostatic actuator, the positioning accuracy or the responsiveness is not high. Specifically, when the conductive polymer actuator or the laminated electrostatic actuator completes the expansion and contraction at a predetermined position, the conductive polymer actuator or the laminated electrostatic actuator is gradually settled at a predetermined position while vibration is damped in the expanding-contracting direction, for example. In contrast, in the electromagnetic force actuator, the positioning accuracy or the responsiveness is satisfactory. Specifically, when the relative movement between the fixed magnetic pole portion and the variable magnetic pole portion is completed at a predetermined position, the fixed magnetic pole portion and the variable magnetic pole portion are accurately and immediately stopped and positioned at the predetermined position.

Therefore, when the movement of the rod (that is, the expansion and contraction of the electric actuator) is completed, the relative movement between the fixed magnetic pole portion and the variable magnetic pole portion is stopped at the position where the movement of the rod is completed. In this manner, vibration that may occur in the conductive polymer actuator or the laminated electrostatic actuator can be suppressed. Therefore, in the whole electric actuator, the responsiveness can be high, and the highly accurate positioning can be performed.

Advantageous Effects of Invention

According to the electric actuator in the present disclosure, the actuator can be miniaturized, the highly accurate positioning can be performed while the required operating force is ensured, and mechanical jamming does not occur.

BRIEF DESCRIPTION OF DRAWINGS

FIG. 19 is a schematic configuration diagram illustrating an operation of an electrode laminated element.

DESCRIPTION OF EMBODIMENTS

Hereinafter, an electric actuator according to an embodiment of the present disclosure will be described with reference to the drawings.

An electric actuator 1A is suitably adopted for an expansion-contraction type actuator used in operating a control surface of an aircraft, for example.

For example, the control surface of the aircraft includes an aileron, an elevator, and a rudder, but is not limited to the control surfaces.

In addition, as a matter of course, the electric actuator 1A can also be adopted as the expansion-contraction type actuator used for operations other than operation of the control surface of the aircraft.

Figure 1:
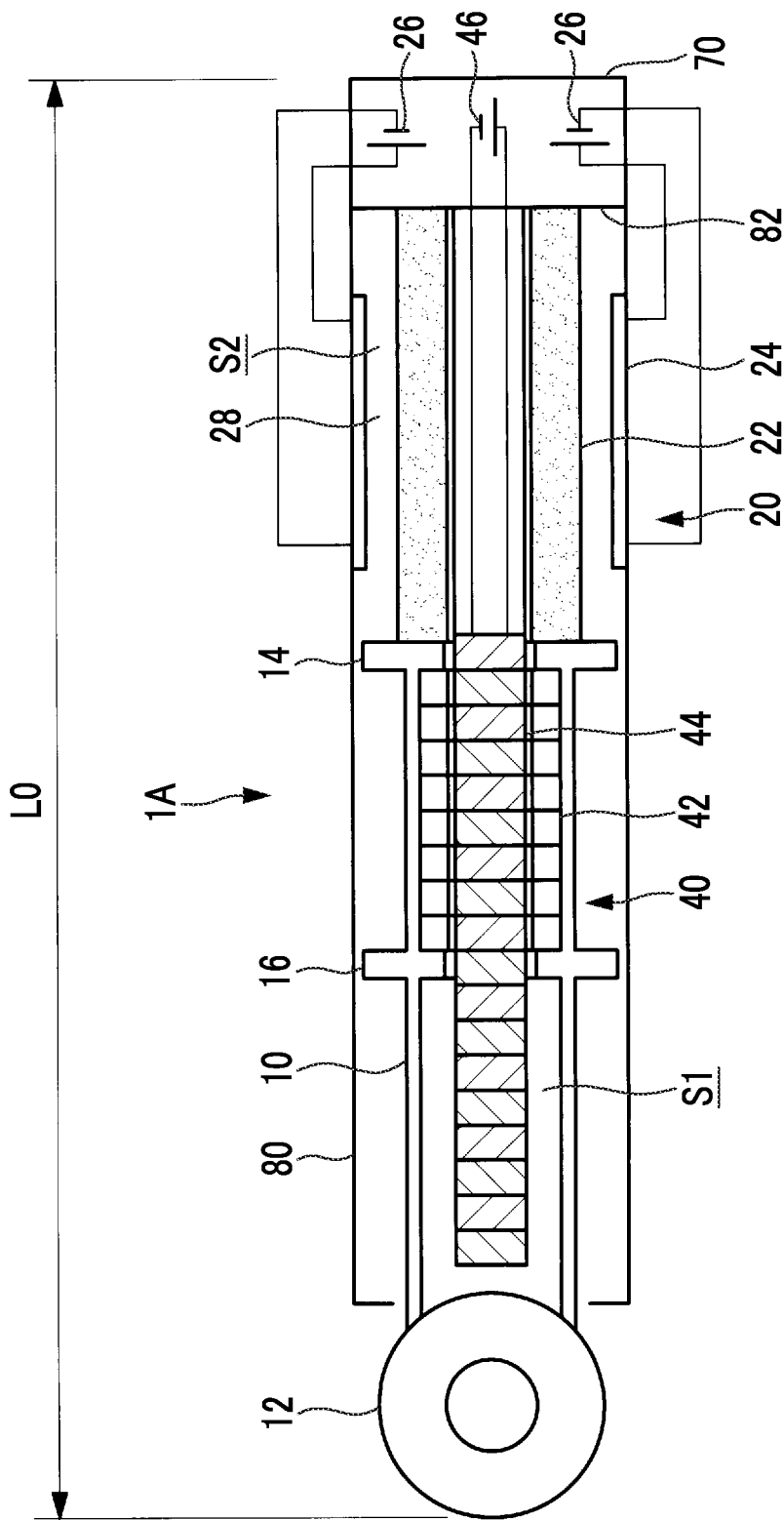
FIG. 1 is a longitudinal sectional view of an electric actuator according to an embodiment of the present disclosure.

As illustrated in FIG. 1, the electric actuator 1A includes a tubular casing 80, a rod 10 accommodated in the casing 80, a conductive polymer actuator 20 for moving the rod 10, and an electromagnetic force actuator 40.

In addition, the electric actuator 1A may include an electricity supply unit 70 that supplies electricity to the conductive polymer actuator 20 and the electromagnetic force actuator 40. The electricity supply unit 70 may be an external power supply as will be described later.

As illustrated in FIG. 1, the casing 80 is a tubular member, and internally accommodates the rod 10, the conductive polymer actuator 20, and the electromagnetic force actuator 40 (to be described later). For example, the casing 80 is made of stainless steel. In addition, the casing 80 may be made of titanium or aluminum.

Figure 2:
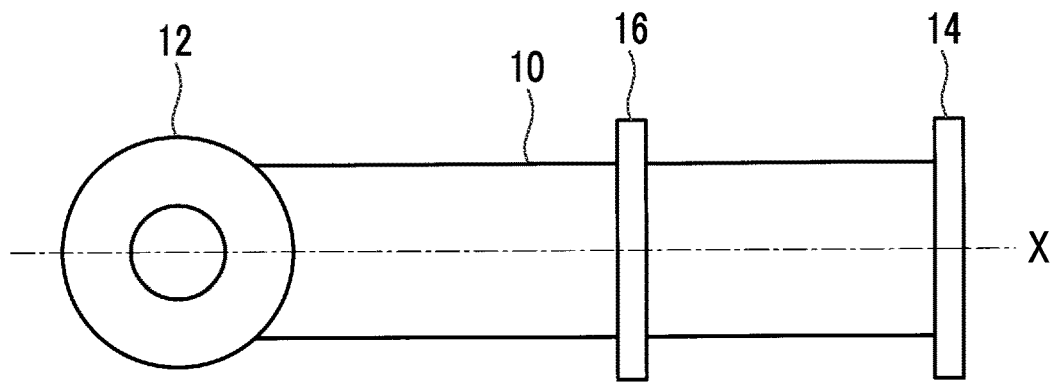
FIG. 2 is a front view of a rod.
Figure 3:
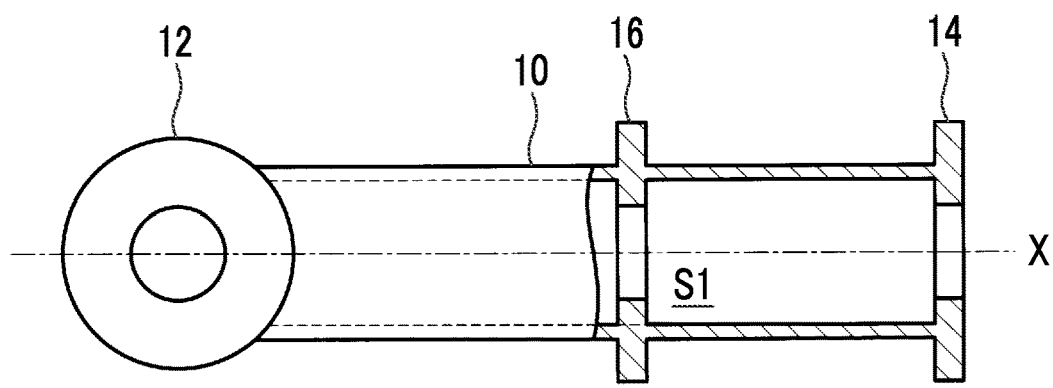
FIG. 3 is a partial sectional view of the rod.

As illustrated in FIGS. 1 to 3, the rod 10 extends in a direction of an axis X (hereinafter, simply referred to as an "axial direction"), and is a rod-shaped member which is partially hollow due to an internally formed space S1. For example, the rod 10 is made of stainless steel. In addition, the casing 80 may be made of titanium or aluminum.

A connecting portion 12 is provided in a tip side (left side in FIG. 2) of the rod 10. For example, the connecting portion 12 is connected to a control surface side of an aircraft.

An operating force is transmitted to the control surface of the aircraft from the electric actuator 1A via the connecting portion 12.

A base portion side flange portion 14 is integrally formed on a base portion side (right side in FIG. 2) of the rod 10.

The base portion side flange portion 14 has an outer diameter larger than an outer diameter of the rod 10. In addition, the base portion side flange portion 14 has an inner diameter smaller than an inner diameter of the hollow rod 10.

In the rod 10, a tip side flange portion 16 is integrally formed between the connecting portion 12 and the base portion side flange portion 14 in the axial direction.

The tip side flange portion 16 has the outer diameter larger than the outer diameter of the rod 10, as in the base portion side flange portion 14. In addition, the base portion side flange portion 14 has an inner diameter smaller than an inner diameter of the hollow rod 10.

In this case, it is preferable that the inner diameter of the tip side flange portion 16 and the inner diameter of the base portion side flange portion 14 are the same as each other. The same applies to the outer diameter.

The tip side flange portion 16 and the base portion side flange portion 14 may not necessarily be formed integrally with the rod 10. The tip side flange portion 16 and the base portion side flange portion 14 which are separated from each other may be connected and fixed to the rod 10.

Figure 4:
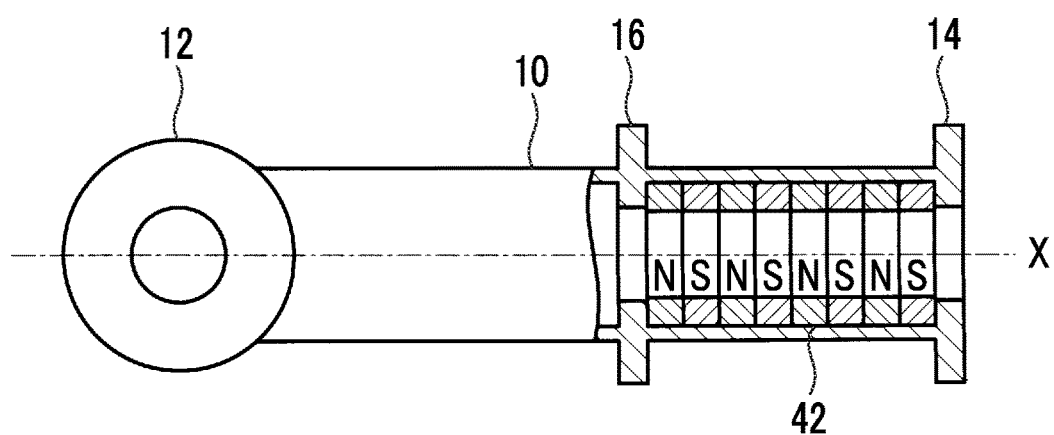
FIG. 4 is a partial sectional view of the rod to which a fixed magnetic pole portion is fixed.

As illustrated in FIG. 4, between the tip side flange portion 16 and the base portion side flange portion 14 inside the rod 10 (space S1), specifically, between a side surface (right side surface in FIG. 1) of the tip side flange portion 16 and a side surface (left side surface in FIG. 1) of the base portion side flange portion 14 which face each other in the axial direction, a fixed magnetic pole portion 42 having an annular shape when viewed in the axial direction is fixed to an inner peripheral surface of the rod 10 (for example, fixed by fitting).

For example, the fixed magnetic pole portion 42 is a permanent magnet, and an arrangement of magnetic poles is fixed along the axial direction. Specifically, an S-pole and an N-pole are alternately arranged along the axial direction. In a case of FIG. 4, the N-pole, the S-pole, the N-pole, and so forth are fixed and arranged in this order from the tip side flange portion 16 side.

The fixed magnetic pole portion 42 described above is one of components configuring the electromagnetic force actuator 40 illustrated in FIG. 1. Details of the electromagnetic force actuator 40 will be described later.

As illustrated in FIG. 1, the conductive polymer actuator 20 includes a conductive polymer 22 and an electrode 24.

Figure 5:
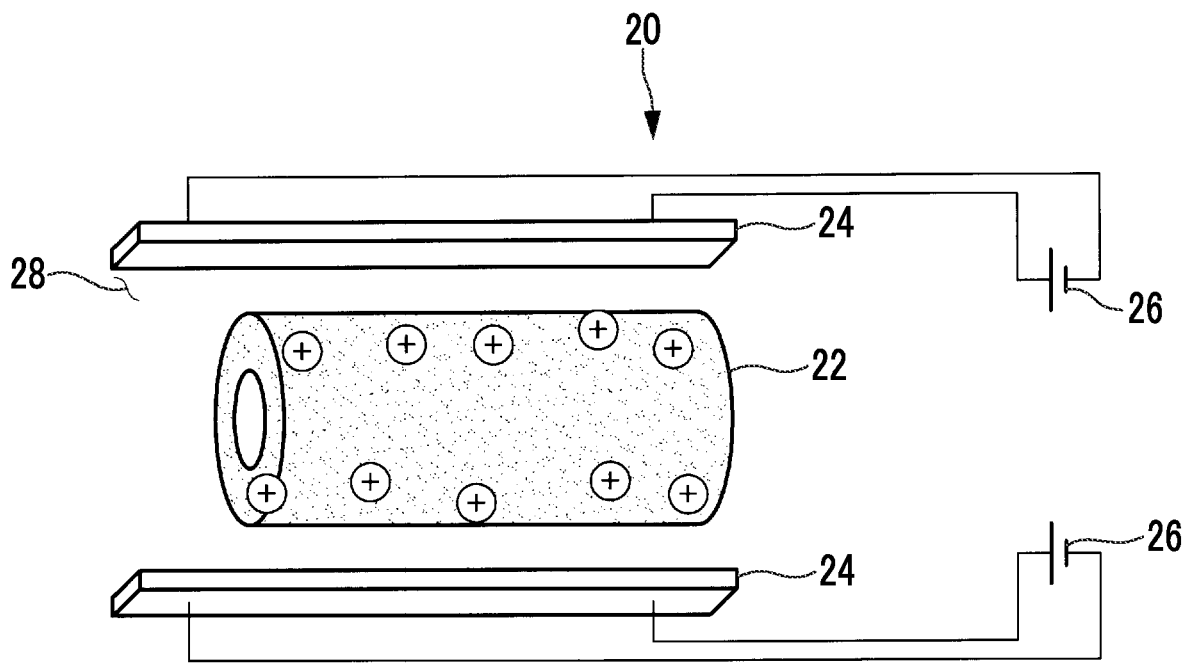
FIG. 5 is a schematic configuration diagram illustrating an operation of a conductive polymer actuator.

As illustrated in FIG. 5, the conductive polymer 22 is a tubular object extending in a predetermined direction (rightward-leftward direction in FIG. 5).

As illustrated in FIG. 1, the conductive polymer 22 is accommodated in the casing 80, and one end (right end in FIG. 1) in the extending direction is connected to an inner bottom portion (base portion 82) of the casing 80. In addition, the other end (left end in FIG. 1) is connected to a side surface (right side surface of the base portion side flange portion 14 in FIG. 1) of the base portion side flange portion 14 formed in the rod 10.

A plurality of electrodes 24 are provided inside the casing 80 and around the conductive polymer 22. In FIG. 1, each of the electrodes 24 is provided on an inner peripheral surface of the casing 80.

Each of the electrodes 24 is electrically connected to a first power supply 26 of the electricity supply unit 70 via an electric power line, and electricity is supplied from each first power supply 26.

In this case, a space S2 formed between the inner peripheral surface of the casing 80 and the outer peripheral surface of the conductive polymer 22 is filled with an electrolyte 28, and an electric current supplied from the first power supply 26 to the electrode 24 can flow to the conductive polymer 22 via the electrolyte 28.

Figure 6:
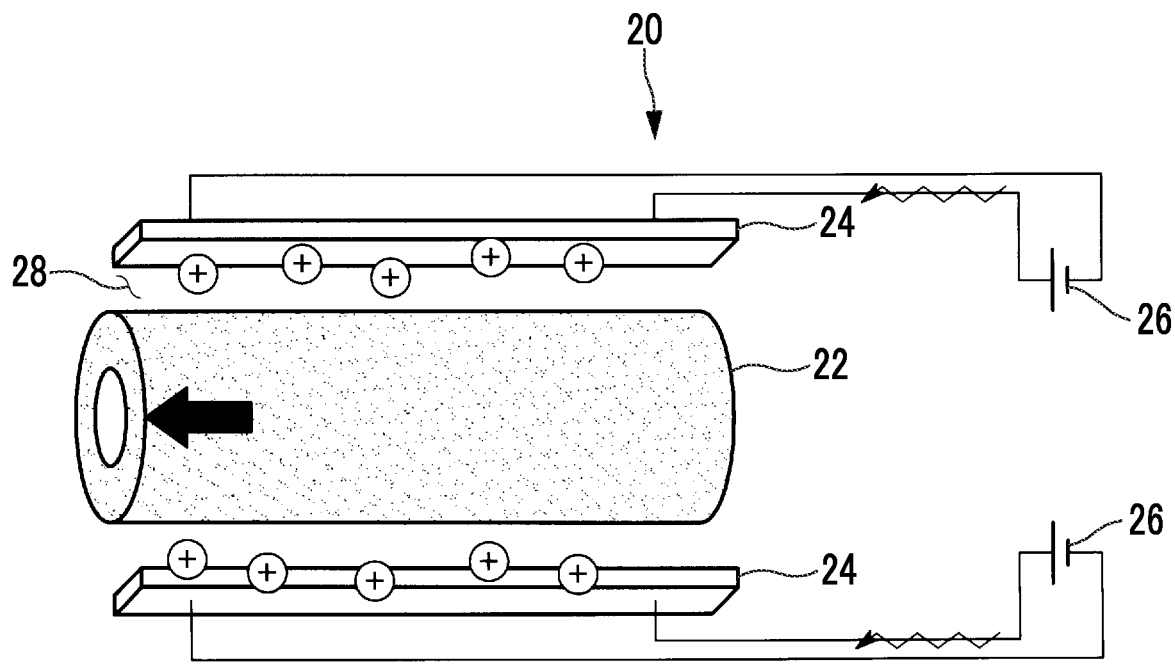
FIG. 6 is a schematic configuration diagram illustrating an operation of the conductive polymer actuator.

As illustrated in FIGS. 5 and 6, the conductive polymer 22 expands and contracts when the electric current flows from the electrode 24 via the electrolyte 28. In a case of FIGS. 5 and 6, the conductive polymer 22 extends in the extending direction.

For example, a material of the conductive polymer 22 is a semiconductor material such as polyacetylene, polyethylene, or polyester containing a conductive material such as carbon. For example, the electrolyte 28 is a potassium hydroxide solution or a lithium salt solution.

As described above, one end of the conductive polymer 22 in the expanding-contracting direction is connected to the base portion 82 of the casing 80, and the other end is connected to the rod 10 (base portion side flange portion 14). In addition, the axial direction of the rod 10 and the expanding-contracting direction of the conductive polymer 22 coincide with each other.

Figure 7:
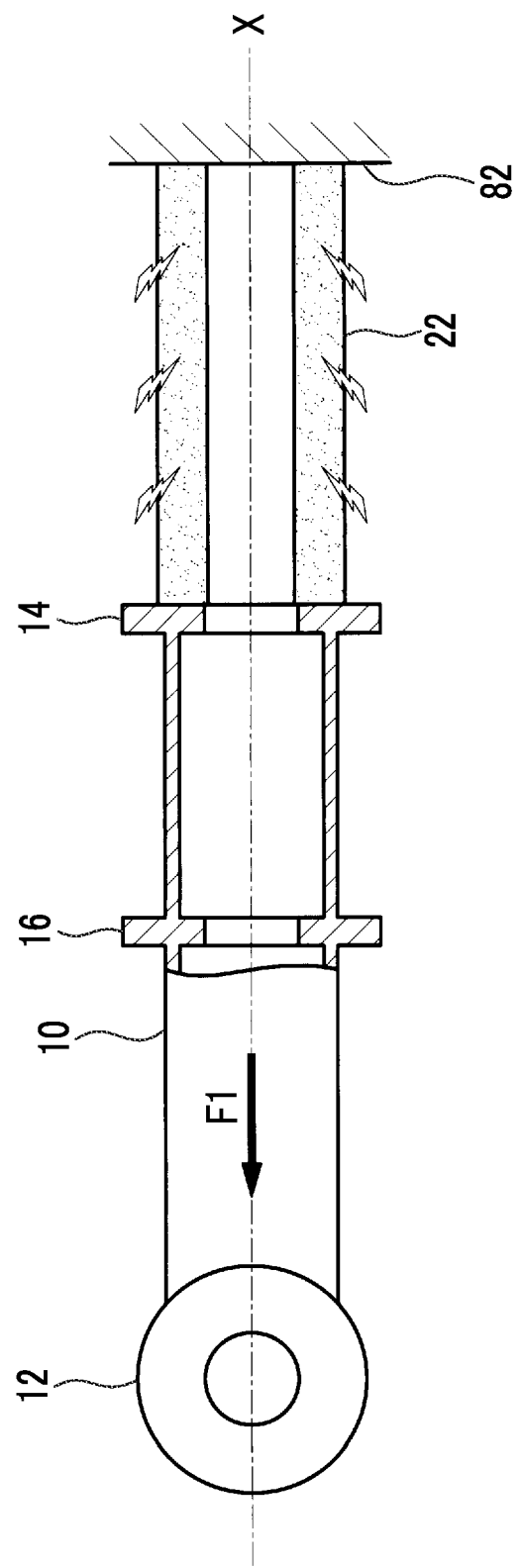
FIG. 7 is a longitudinal sectional view of the rod and a conductive polymer that applies an operating force to the rod.

Therefore, as illustrated in FIG. 7, the rod 10 is moved in the axial direction by the expansion and contraction of the conductive polymer 22. In this case, an operating force applied to the rod 10 by the conductive polymer 22 will be defined as F1. However, F1 is convenient description of the operating force, and may be a constant or a variable.

FIG. 7 is simplified for the purpose of description, and the description of each component is omitted except for the rod 10, the conductive polymer 22, and a portion of the base portion 82.

As illustrated in FIG. 1, the electromagnetic force actuator 40 includes the above-described fixed magnetic pole portion 42 and the variable magnetic pole portion 44.

As described above, the fixed magnetic pole portion 42 has an annular shape when viewed in the axial direction, and is fixed to the inner peripheral surface of the rod 10 located between the tip side flange portion 16 and the base portion side flange portion 14.

Figure 8:
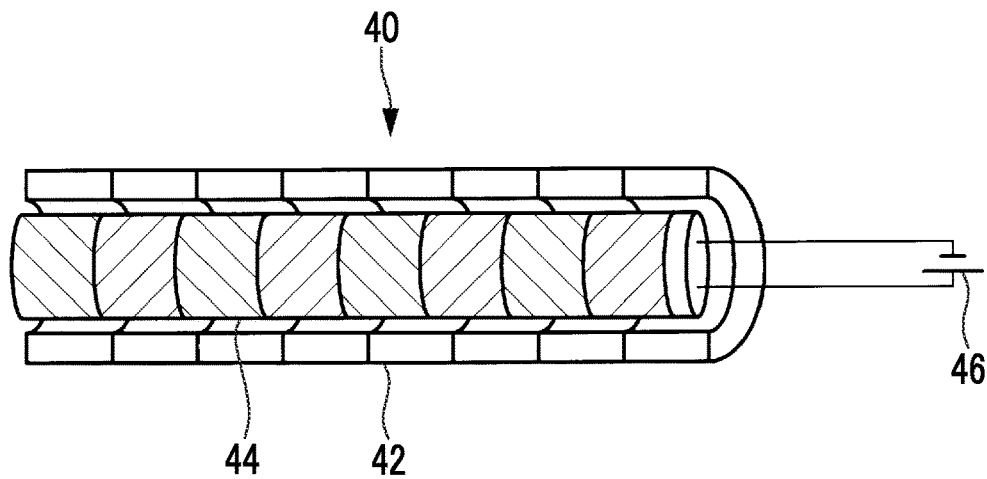
FIG. 8 is a schematic configuration diagram illustrating an operation of an electromagnetic force actuator.

As illustrated in FIGS. 1 and 8, the variable magnetic pole portion 44 is a rod-shaped object extending in a predetermined direction (rightward-leftward direction in FIG. 8). In addition, as illustrated in FIG. 1, a section on one end side (left end side in FIG. 1) in the extending direction is an electromagnet in which a magnetic force is generated by an electric current.

As illustrated in FIG. 1, the variable magnetic pole portion 44 is accommodated in the casing 80, and is inserted into the annular conductive polymer 22 and the annular fixed magnetic pole portion 42. In addition, the other end (right end in FIG. 1) in the extending direction is connected to the base portion 82 of the casing 80.

The variable magnetic pole portion 44 is electrically connected to a second power supply 46 of the electricity supply unit 70 via an electric power line, and electricity is supplied from the second power supply 46.

Figure 9:
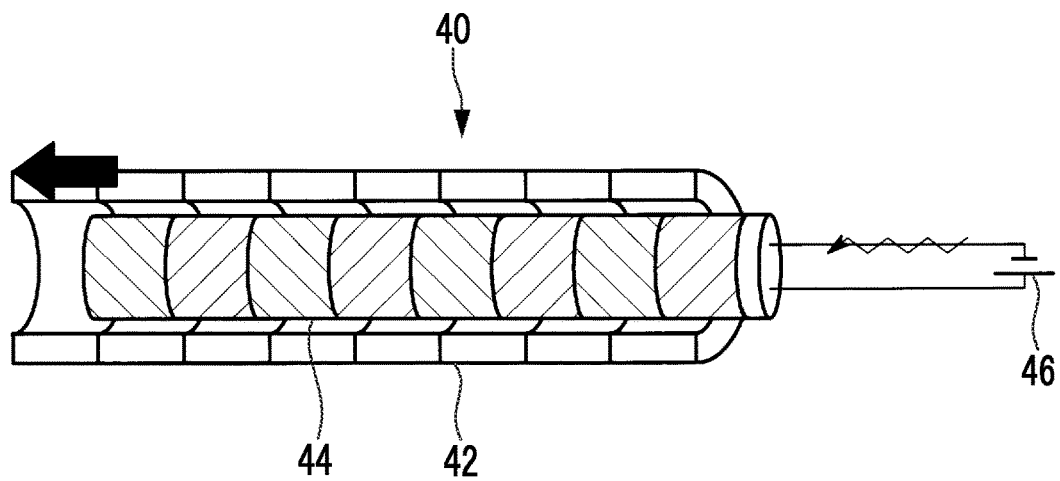
FIG. 9 is a schematic configuration diagram illustrating an operation of the electromagnetic force actuator.
Figure 10:
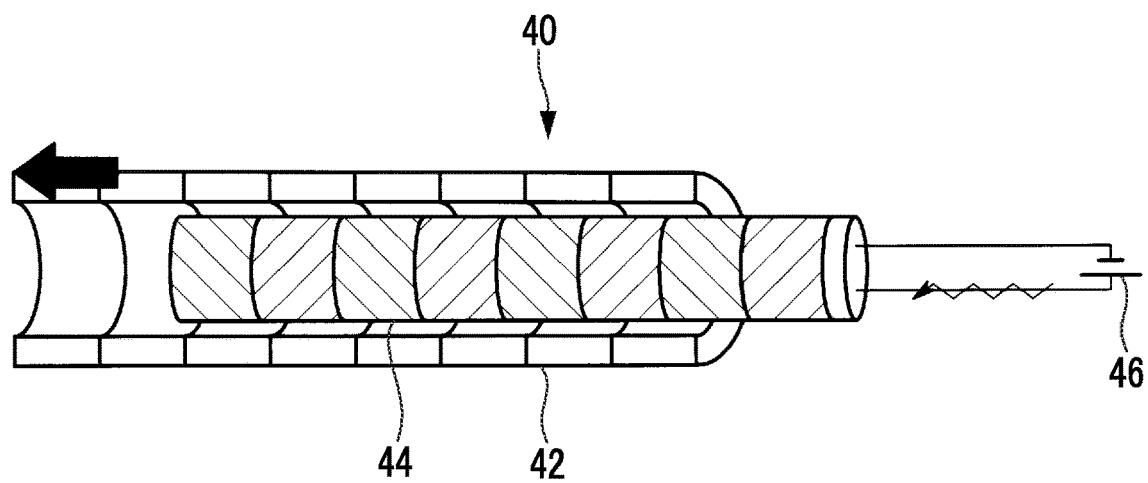
FIG. 10 is a schematic configuration diagram illustrating an operation of the electromagnetic force actuator.

As illustrated in FIGS. 8 to 10, the variable magnetic pole portion 44 can change the arrangement of the S-pole and the N-pole along the extending direction by switching between phases of the electric current supplied from the second power supply 46. Specifically, magnetic poles arranged in the order of the N-pole, the S-pole, the N-pole, and so forth along the extending direction are arranged in the order of the S-pole, the N-pole, the S-pole, and so forth.

As described above, the variable magnetic pole portion 44 is inserted into the fixed magnetic pole portion 42. Accordingly, the fixed magnetic pole portion 42 and the variable magnetic pole portion 44 relatively move in a non-contact manner by changing the arrangement of the magnetic poles.

In this case, as illustrated in FIGS. 1 and 4, the fixed magnetic pole portion 42 is fixed to the rod 10. In addition, a direction of the relative movement between the fixed magnetic pole portion 42 and the variable magnetic pole portion 44 coincides with the axial direction of the rod 10.

Figure 11:
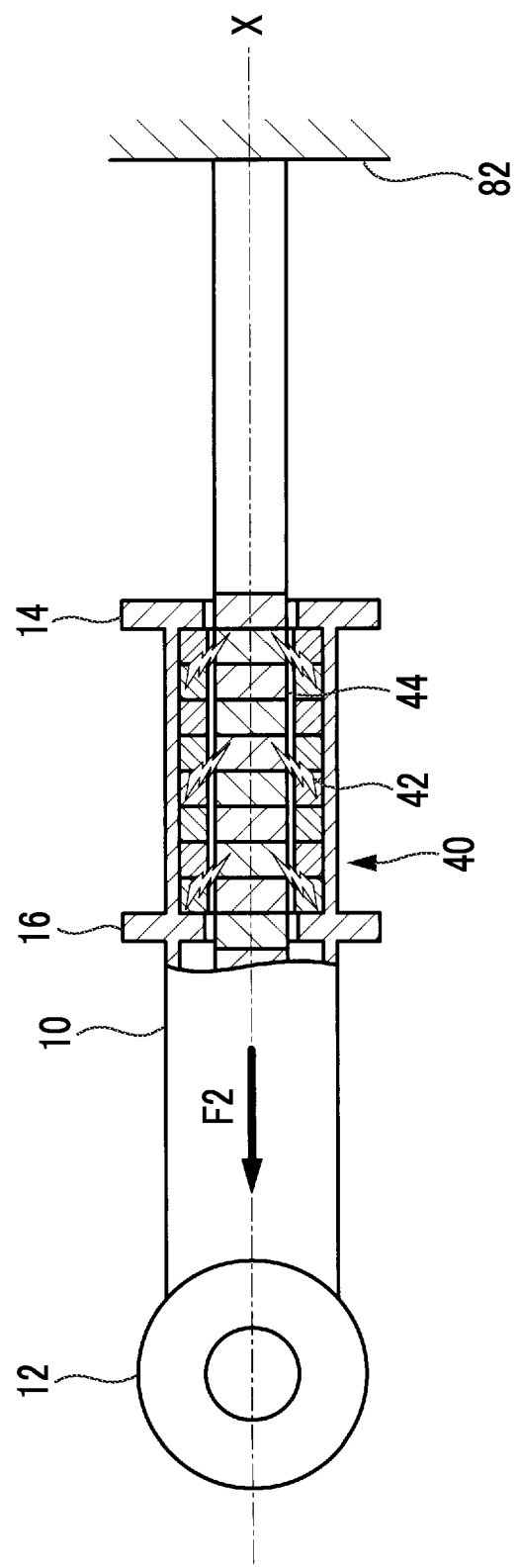
FIG. 11 is a longitudinal sectional view of the rod and the electromagnetic force actuator that applies an operating force to the rod.

Therefore, as illustrated in FIG. 11, the rod 10 is moved in the axial direction by the relative movement between the fixed magnetic pole portion 42 and the variable magnetic pole portion 44. In this case, an operating force F2 is applied to the fixed magnetic pole portion 42 by the variable magnetic pole portion 44. In the present embodiment, the variable magnetic pole portion 44 is connected to the casing 80. Accordingly, as a result, the operating force F2 is applied to the rod 10. In addition, the rod 10 is moved with respect to the casing 80.

However, F2 is convenient description of the operating force, and may be a constant or a variable.

FIG. 11 is simplified for the purpose of description, and the description of each component is omitted except for the rod 10, the electromagnetic force actuator 40, and a portion of the base portion 82.

As illustrated in FIG. 1, the electricity supply unit 70 includes the first power supply 26 and the second power supply 46. The electricity supply unit 70 can transmit and receive signals to and from a control unit (not illustrated), and characteristics (electric current, voltage, and frequency) of electricity output from the first power supply 26 and the second power supply 46 are controlled by the control unit.

The electricity supply unit 70 may be provided integrally with the electric actuator 1A, or may be a separate body (that is, an external power supply). In addition, the first power supply 26 and the second power supply 46 may be a single power supply. In this case, the electricity is supplied from the single power supply to the conductive polymer 22 and the variable magnetic pole portion 44 by a parallel circuit.

In addition, for example, the control unit is configured to include a central processing unit (CPU), a random access memory (RAM), a read only memory (ROM), and a computer-readable storage medium. Then, as an example, a series of processes for realizing various functions are stored in a storage medium in a form of a program. The CPU reads the program in the RAM, and executes information processing and arithmetic processing. In this manner, various functions are realized. The program may adopt a form in which the program is installed in advance in the ROM or another storage medium, a form in which the program is provided in a stored state in a computer-readable storage medium, or a form in which the program is delivered via wired or wireless communication means. The computer-readable storage medium is a magnetic disc, a magneto-optical disc, a CD-ROM, a DVD-ROM, or a semiconductor memory.

Figure 12:
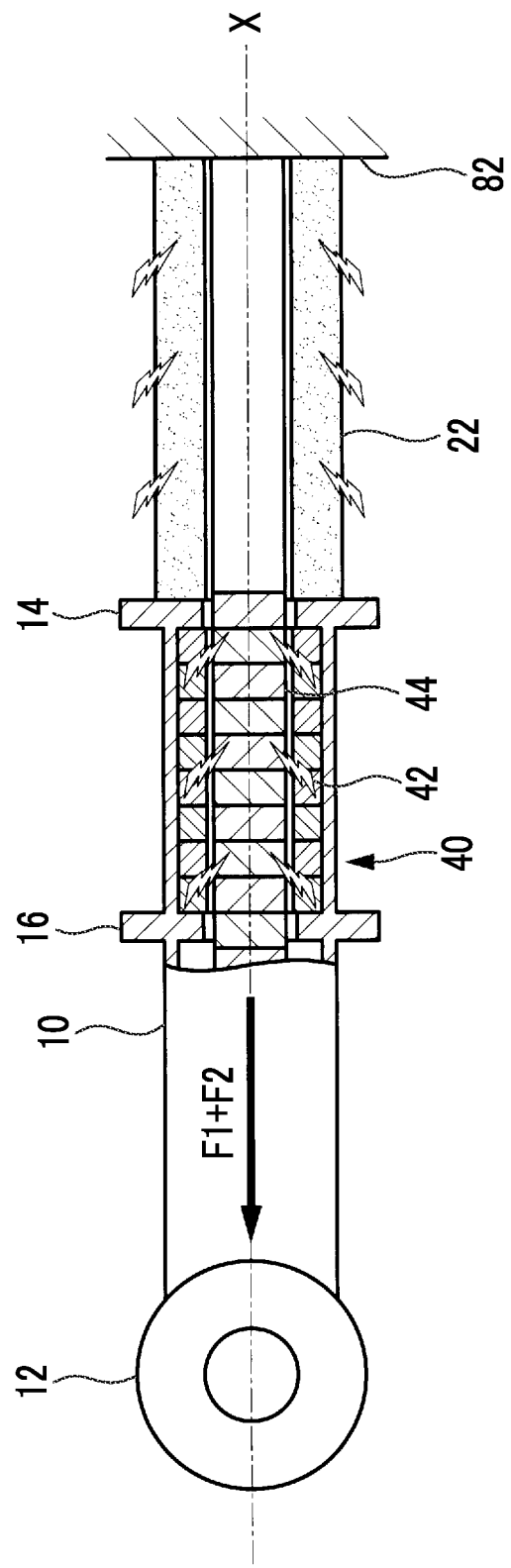
FIG. 12 is a longitudinal sectional view of the rod, the conductive polymer actuator, and the electromagnetic force actuator.

As illustrated in FIG. 12, the conductive polymer 22 and the fixed magnetic pole portion 42 are indirectly connected to each other via the rod 10. Specifically, the conductive polymer 22 connected to the base portion side flange portion 14 is indirectly connected to the fixed magnetic pole portion 42 fixed to the base portion side flange portion 14 and the tip side flange portion 16 via the base portion side flange portion 14.

In addition, the rod 10 is connected to the conductive polymer 22 and the fixed magnetic pole portion 42.

Therefore, the fixed magnetic pole portion 42 is moved together with the rod 10 in the axial direction by the conductive polymer 22. When the rod 10 is moved, an operating force F1 is applied to the rod 10 from the conductive polymer 22.

In addition, an operating force F2 is applied to the fixed magnetic pole portion 42 from the variable magnetic pole portion 44 connected to the casing 80. As a result, the operating force F2 is applied from the variable magnetic pole portion 44 to the rod 10 connected to the fixed magnetic pole portion 42.

Therefore, the operating force F2 is applied from the variable magnetic pole portion 44 to the rod 10 to which the operating force F1 is applied from the conductive polymer 22. That is, two operating forces (operating force F1 and operating force F2) can be applied in parallel to the rod 10 from the conductive polymer 22 and the fixed magnetic pole portion 42. In other words, the operating forces can be simultaneously applied to the rod 10 by the conductive polymer actuator 20 and the electromagnetic force actuator 40.

Figure 13:
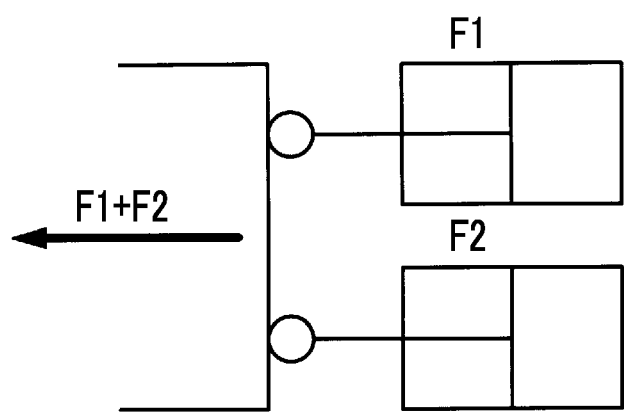
FIG. 13 is a view obtained by modeling a connection relationship of the conductive polymer actuator and the electromagnetic force actuator with respect to the rod.

FIG. 13 is a view obtained by modeling how the operating force F1 of the conductive polymer actuator 20 and the operating force F2 of the electromagnetic force actuator 40 are applied to the rod 10.

As illustrated in FIGS. 12 and 13, the expansion and contraction of the conductive polymer 22 and the movement of the fixed magnetic pole portion 42 are simultaneously performed. In this manner, a resultant force of the operating force F1 and the operating force F2 is applied to the rod 10. Specifically, a control unit (not illustrated) controls electricity output from the first power supply 26 and the second power supply 46 so that the expansion and contraction of the conductive polymer 22 and the movement of the fixed magnetic pole portion 42 are simultaneously performed. In this manner, the resultant force of the operating force F1 and the operating force F2 can be applied to the rod 10.

Next, controlling performed when expanding and contracting the electric actuator 1A, based on characteristics of the conductive polymer actuator 20 and the electromagnetic force actuator 40 will be described.

The conductive polymer actuator 20 has the following characteristics.

That is, the conductive polymer actuator 20 can generate the operating force greater than that of the electromagnetic force actuator 40. On the other hand, positioning accuracy or responsiveness of the conductive polymer actuator 20 is not higher than that of the electromagnetic force actuator 40.

Figure 14:
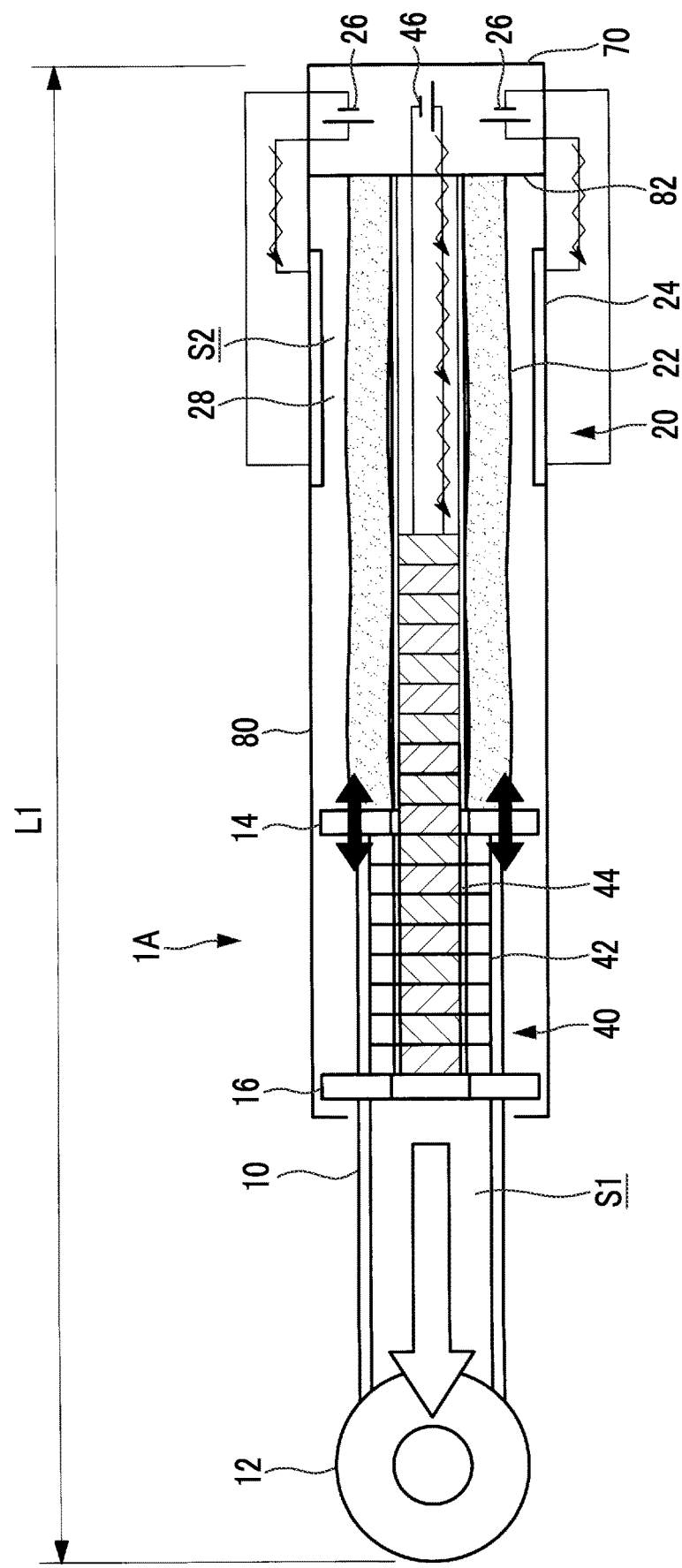
FIG. 14 is a longitudinal sectional view illustrating an operation of the electric actuator according to the embodiment of the present disclosure.

For example, as illustrated in FIG. 14, a case is considered where a length of the electric actuator 1A is extended from L0 (refer to FIG. 1) to L1, that is, a case where the rod 10 is moved by L1 to L0.

Figure 15:
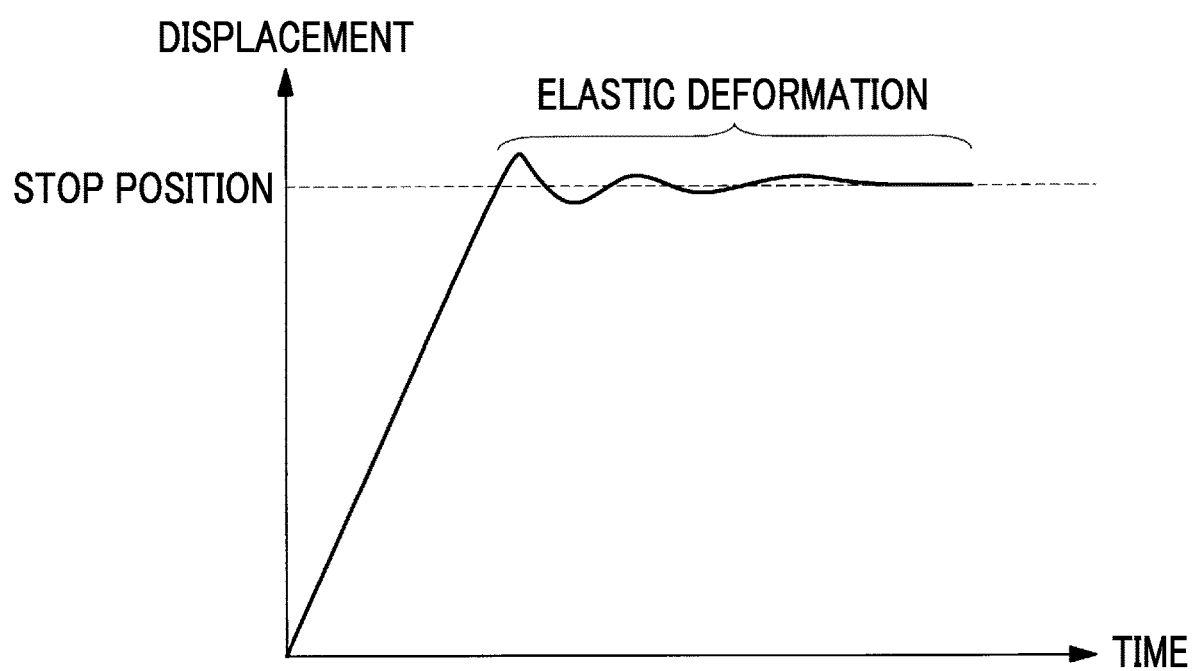
FIG. 15 is a view illustrating a graph relating to setting of the conductive polymer actuator.

When the length of the electric actuator 1A reaches L1, even in a case where the extension of the conductive polymer 22 is stopped at a stop position by the control unit, due to the inertial force caused by its own mass, the elastic conductive polymer 22 is gradually settled while repeating a minute expansion and contraction movement along the axial direction around the stop position. For example, as illustrated in FIG. 15, displacement (vertical axis) of the conductive polymer 22 is gradually settled so that vibration is damped with respect to the stop position with the lapse of time (horizontal axis).

In the above description of the conductive polymer 22, it is assumed that no operating force is applied from the electromagnetic force actuator 40. In addition, it is assumed that only the conductive polymer 22 can bear the operating force required for the movement of the rod 10.

On the other hand, the electromagnetic force actuator 40 has the following characteristics.

That is, the electromagnetic force actuator 40 does not generate the operating force substantially the same as that of the conductive polymer actuator 20. On the other hand, positioning accuracy or responsiveness of the electromagnetic force actuator 40 is higher than that of the electromagnetic force actuator 40.

Due to the characteristics of the electromagnetic force actuator 40, the electric actuator 1A can be extended as follows.

That is, when the length of the electric actuator 1A reaches L1 and the movement of the rod 10 is completed, the electromagnetic force actuator 40 stops the rod 10 at a predetermined position (position where the length of the electric actuator 1A reaches L1). In this manner, elastic deformation of the conductive polymer 22 can be suppressed.

Figure 16:
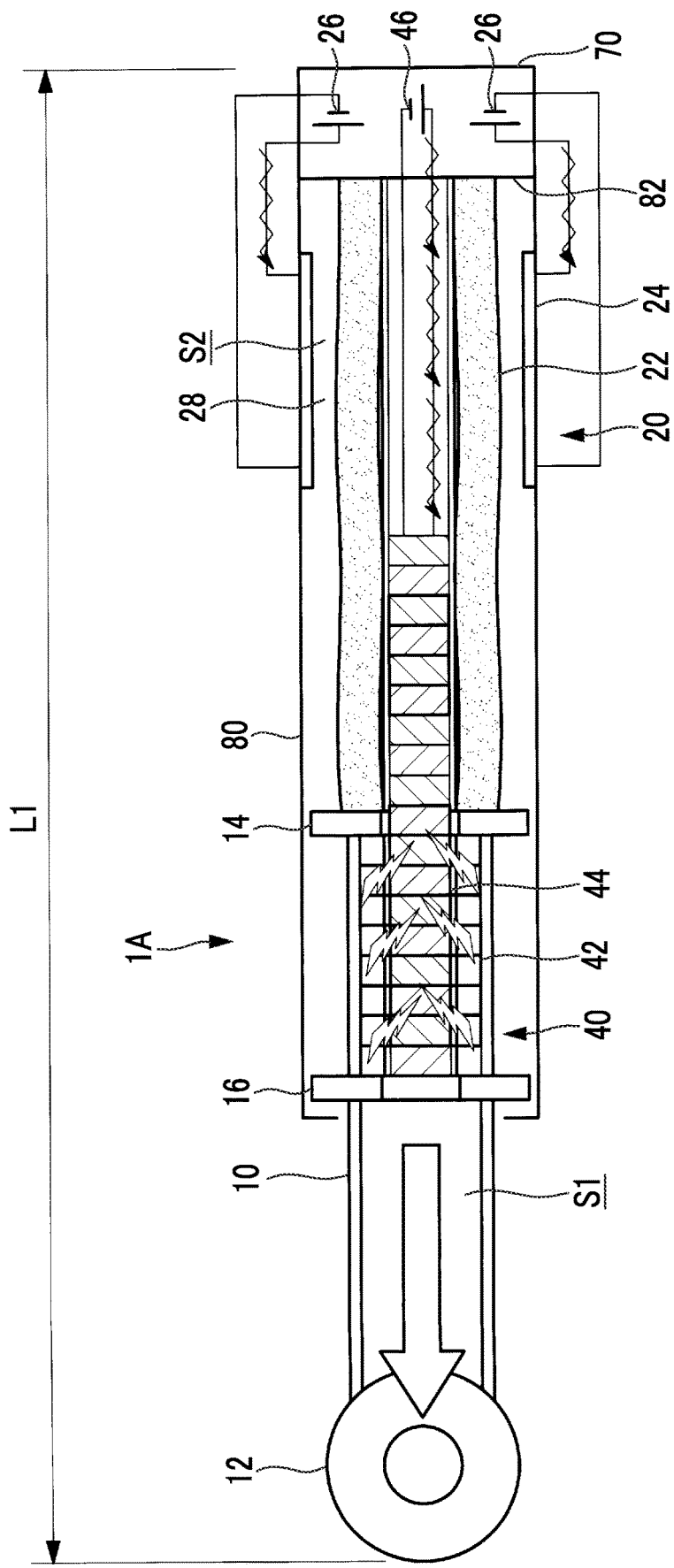
FIG. 16 is a longitudinal sectional view illustrating an operation of the electric actuator according to the embodiment of the present disclosure.
Figure 17:
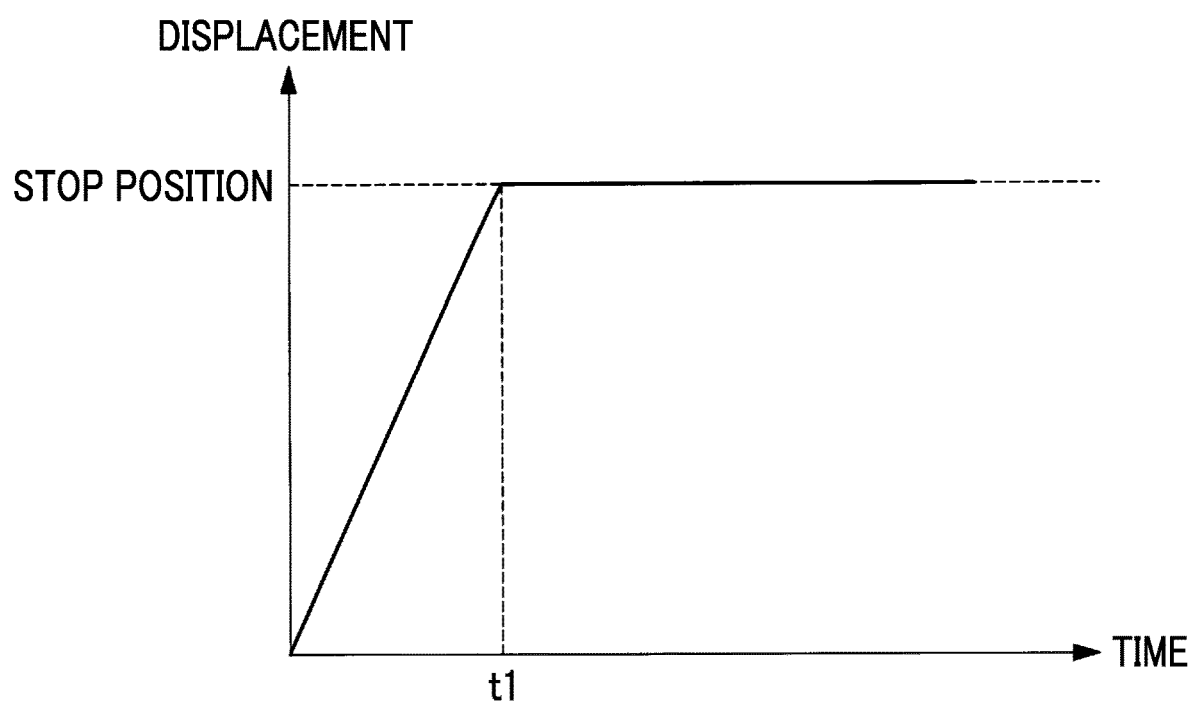
FIG. 17 is a view illustrating a graph relating to setting of the conductive polymer actuator and the electromagnetic force actuator.

For example, as illustrated in FIG. 16, when the length of the electric actuator 1A reaches L1, the control unit stops the extension of the conductive polymer 22, and stops the movement of the fixed magnetic pole portion 42 at the position. In this manner, as in a graph illustrated in FIG. 17, displacement of the conductive polymer 22 can be quickly stopped at the stop position. Specifically, the movement of the fixed magnetic pole portion 42 is stopped at a time t1 when the conductive polymer 22 reaches the stop position. In this manner, the displacement of the conductive polymer 22 can be suppressed, and the conductive polymer 22 can be stopped at the stop position.

A force generated by elastic deformation when completing the extension of the conductive polymer 22 is sufficiently smaller than the operating force F2 which can be applied by the electromagnetic force actuator 40. Therefore, the elastic deformation of the conductive polymer 22 can be easily suppressed by the electromagnetic force actuator 40.

In the above description, a case where the length of the electric actuator 1A is extended has been described as an example. However, the same applies to a case where the rod 10 is moved to shorten the length of the electric actuator 1A.

As described above, when the electric actuator 1A expands and contracts, it is preferable that the rod 10 is simultaneously moved by the operating forces of the conductive polymer actuator 20 and the electromagnetic force actuator 40. The reason is that a greater operating force can be ensured by the two actuators. For example, the operating force required for the movement of the rod 10 is the operating force required for operating the control surface connected to the rod 10.

In addition, when the expansion and contraction of the electric actuator 1A are completed, it is preferable that the relative movement between the fixed magnetic pole portion 42 and the variable magnetic pole portion 44 of the electromagnetic force actuator 40 is stopped at a predetermined position to suppress the elastic deformation of the conductive polymer 22.

According to the electric actuator 1A in the present embodiment, the following advantageous effects are achieved.

The resultant force of the operating force F1 of the conductive polymer actuator 20 and the operating force F2 of the electromagnetic force actuator 40 is applied to the rod 10.

Therefore, the two actuators can sufficiently bear the operating forces required for the movement of the rod 10. Accordingly, electric power required for each actuator can be suppressed, and the actuator can be miniaturized.

In this case, the conductive polymer actuator 20 has a greater expanding-contracting force (that is, the operating force F1 for moving the rod 10) than that of the electromagnetic force actuator 40. However, positioning accuracy or responsiveness is not high. In contrast, the electromagnetic force actuator 40 has a smaller force applied between the variable magnetic pole portion 44 and the fixed magnetic pole portion 42 (that is, the operating force F2 for moving the rod 10) than that of the conductive polymer actuator 20. However, the positioning accuracy or the responsiveness is satisfactory.

Therefore, in the operating force required for the movement of the rod 10 (that is, expansion and contraction of the electric actuator 1A), the conductive polymer actuator 20 is configured to bear most of the operating force, and the electromagnetic force actuator 40 is configured to bear the remaining operating force. In this manner, when the rod 10 is moved, the required operating force can be ensured by the two actuators. In addition, when the movement of the rod 10 is completed, the electromagnetic force actuator 40 can have high responsiveness, and can perform highly accurate positioning.

In addition, in a case where the variable magnetic pole portion 44 is fixed to the casing 80, it is possible to avoid the movement (movement due to the expansion and contraction of the conductive polymer 22) of the variable magnetic pole portion 44 having a more complicated structure than that of the fixed magnetic pole portion 42. Therefore, a simplified structure can be realized.

The fixed magnetic pole portion 42 and the variable magnetic pole portion 44 may be replaced with each other. For example, the variable magnetic pole portion 44 may be fixed to the rod 10, and the fixed magnetic pole portion 42 may be fixed to the casing 80.

Modification Example

Figure 18:
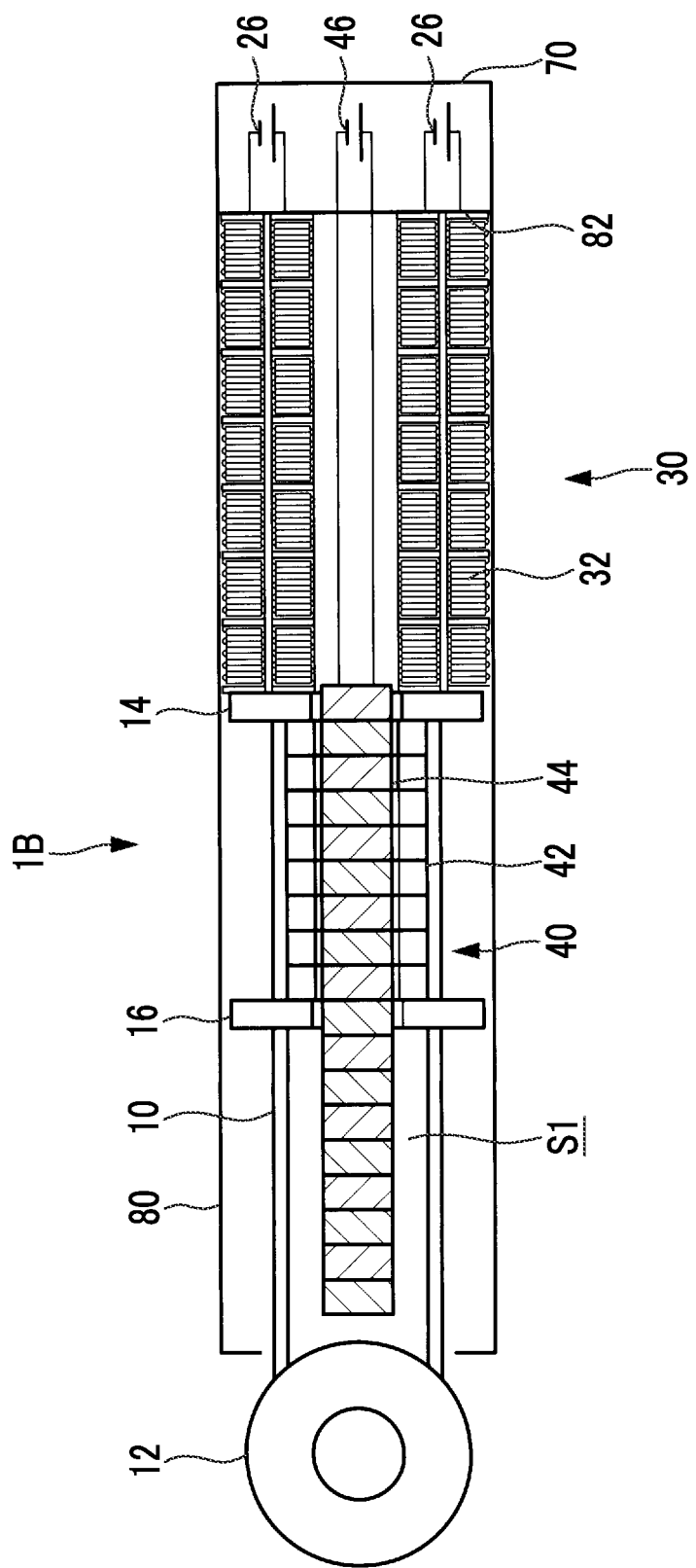
FIG. 18 is a longitudinal sectional view according to a modification example of the electric actuator.

As illustrated in FIG. 18, an electric actuator 1B which adopts a laminated electrostatic actuator 30 may be used instead of the conductive polymer actuator 20.

The laminated electrostatic actuator 30 is configured to arrange a plurality of rows formed by aligning a plurality of electrode laminated elements 32 in the axial direction.

One electrode laminated element 32 is an element in which a plurality of electrodes are laminated in a predetermined direction, and expands and contracts in the predetermined direction (laminating direction) by applying a voltage from the first power supply 26.

Figure 20:
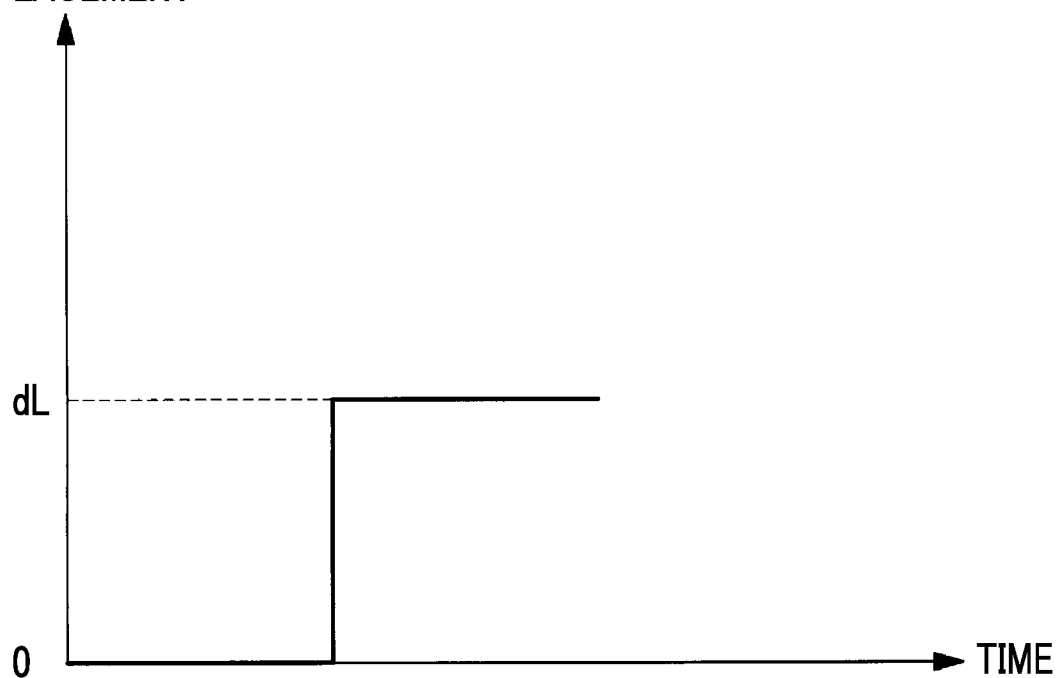
FIG. 20 is a graph illustrating a relationship between displacement and a time of the electrode laminated element.

For example, as illustrated in FIGS. 19 and 20, one electrode laminated element 32 extends by dL in a predetermined direction by the applied voltage.

Figure 21:
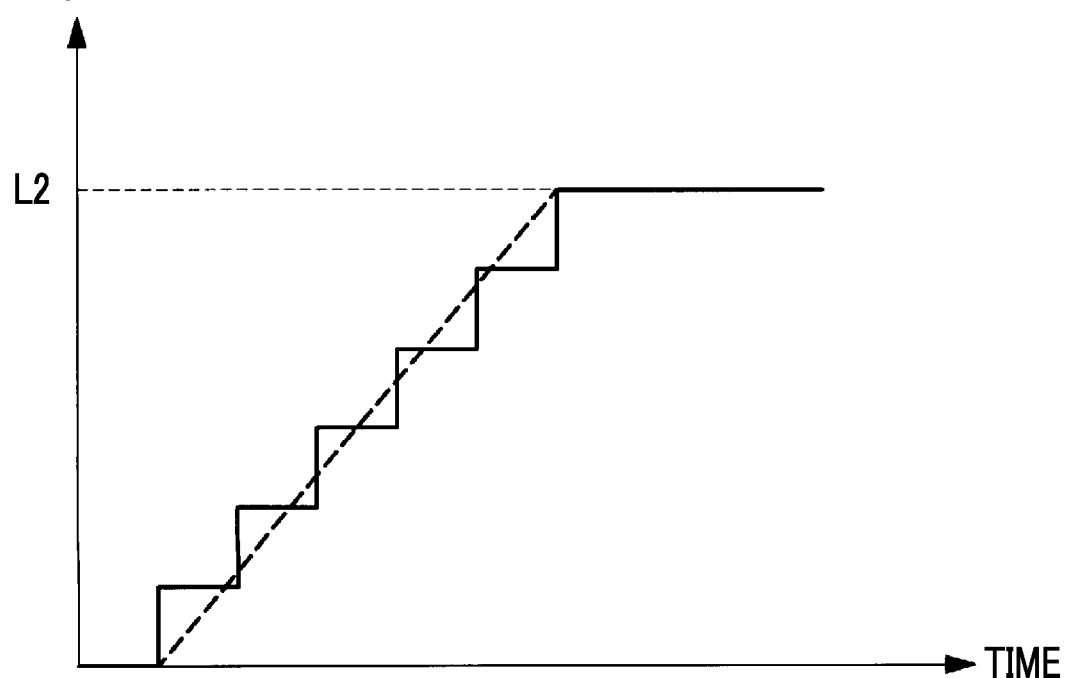
FIG. 21 is a graph illustrating a relationship between displacement and a time of a laminated electrostatic actuator.

In this case, as the laminated electrostatic actuator 30, an appropriate number of the electrode laminated elements 32 are aligned in the axial direction, and each of the electrode laminated elements 32 is extended by dL in a predetermined direction. In this manner, as illustrated in FIG. 21, the length of the laminated electrostatic actuator 30 can be extended to L2. That is, as illustrated by a broken line in FIG. 21, the length of the laminated electrostatic actuator 30 is equivalent to the length of the laminated electrostatic actuator 30 linearly extending to L2.

In this manner, the laminated electrostatic actuator 30 can be adopted instead of the conductive polymer actuator 20.

REFERENCE SIGNS LIST

1A, 1B: electric actuator
10: rod
12: connecting portion
14: base portion side flange portion
16: tip side flange portion
20: conductive polymer actuator
22: conductive polymer
24: electrode
26: first power supply
28: electrolyte
30: laminated electrostatic actuator
32: electrode laminated element
40: electromagnetic force actuator
42: fixed magnetic pole portion
44: variable magnetic pole portion
46: second power supply
70: electricity supply unit
80: casing
82: base portion
S1: space
S2: space
X: axis

The invention claimed is:

1. An electric actuator comprising:
a rod formed of a rod-shaped member;
a conductive polymer actuator having a conductive polymer that expands and contracts in a predetermined direction by an electric current, or a laminated electrostatic actuator having an electrode laminated element that expands and contracts in a predetermined direction by an electric current; and
an electromagnetic force actuator having a fixed magnetic pole portion in which a magnetic pole arrangement is fixed, and a variable magnetic pole portion in which the magnetic pole arrangement is changed by switching the electric current, and in which the magnetic pole arrangement of the variable magnetic pole portion is changed so that the fixed magnetic pole portion and the variable magnetic pole portion move relative to each other,
wherein any one of the fixed magnetic pole portion and the variable magnetic pole portion is connected to the conductive polymer or the electrode laminated element so that a relative movement direction thereof coincides with an expanding-contracting direction of the conductive polymer or the electrode laminated element, and the rod is connected to the conductive polymer or the electrode laminated element, and the one of the fixed magnetic pole portion and the variable magnetic pole portion which are connected to the conductive polymer or the electrode laminated element.

2. The electric actuator according to claim 1, further comprising:

a casing that accommodates the rod, wherein one end side of the conductive polymer or the electrode laminated element in the expanding-contracting direction is connected to the casing, the variable magnetic pole portion is fixed to the casing, the fixed magnetic pole portion is connected to the other end side of the conductive polymer or the electrode laminated element in the expanding-contracting direction, and the rod is connected to the fixed magnetic pole portion.

3. The electric actuator according to claim 1, further comprising:

an electricity supply unit that supplies electricity to the conductive polymer actuator or the laminated electrostatic actuator, and the variable magnetic pole portion; and a control unit that controls the electricity output from the electricity supply unit, wherein when the rod is moved, the control unit controls the electricity supply unit to perform expansion and contraction of the conductive polymer actuator or the laminated electrostatic actuator simultaneously with relative movement between the variable magnetic pole portion and the fixed magnetic pole portion.

4. The electric actuator according to claim 3, wherein when the movement of the rod is completed, the control unit controls the electricity supply unit to stop the relative movement between the fixed magnetic pole portion and the variable magnetic pole portion.

* * * * *